(12) United States Patent
Gong et al.

(10) Patent No.: US 11,893,172 B2
(45) Date of Patent: Feb. 6, 2024

(54) INFORMATION PROCESSING METHOD BASED ON ELECTRONIC DEVICE INTERACTION, AND ELECTRONIC DEVICE FOR ESTABLISHING COMMUNICATION BY SENDING COMMUNICATION PROTOCOL

(71) Applicant: Lenovo (Beijing) Limited, Beijing (CN)

(72) Inventors: Junbin Gong, Beijing (CN); Dan Zhang, Beijing (CN); Song Ye, Beijing (CN); Lianqiang Lv, Beijing (CN)

(73) Assignee: LENOVO (BEIJING) LIMITED, Beijing (CN)

( * ) Notice: Subject to any disclaimer, the term of this patent is extended or adjusted under 35 U.S.C. 154(b) by 0 days.

(21) Appl. No.: 17/687,439

(22) Filed: Mar. 4, 2022

(65) Prior Publication Data

US 2023/0046997 A1  Feb. 16, 2023

(30) Foreign Application Priority Data

Aug. 13, 2021 (CN) .......................... 202110931612.2

(51) Int. Cl.
*G06F 3/03* (2006.01)
*G06F 3/0354* (2013.01)
*G06F 3/041* (2006.01)

(52) U.S. Cl.
CPC ...... *G06F 3/03545* (2013.01); *G06F 3/04162* (2019.05)

(58) Field of Classification Search
CPC ............. G06F 3/03545; G06F 3/04162; G06F 3/0416; G06F 21/30
See application file for complete search history.

(56) References Cited

U.S. PATENT DOCUMENTS

2015/0245186 A1* 8/2015 Park ....................... H04W 4/16
                                                                  455/417
2018/0206276 A1* 7/2018 Chien ................... G06F 13/385

FOREIGN PATENT DOCUMENTS

CN          105635146 A       6/2016

\* cited by examiner

*Primary Examiner* — Lisa S Landis
(74) *Attorney, Agent, or Firm* — ANOVA LAW GROUP, PLLC (57) ABSTRACT

An information processing method includes, in a situation that a connection between a first electronic device and a second electronic device is established for first time, obtaining identity information of the second electronic device; obtaining a communication protocol corresponding to the identity information; and based on a data path formed after the first electronic device is connected to the second electronic device, sending the communication protocol to the second electronic device, to enable the second electronic device to communicate with the first electronic device based on the communication protocol.

19 Claims, 8 Drawing Sheets

INFORMATION PROCESSING METHOD BASED ON ELECTRONIC DEVICE INTERACTION, AND ELECTRONIC DEVICE FOR ESTABLISHING COMMUNICATION BY SENDING COMMUNICATION PROTOCOL

CROSS-REFERENCE TO RELATED APPLICATION

This application claims priority to Chinese Patent Application No. 202110931612.2, filed on Aug. 13, 2021, the content of which is incorporated herein by reference in its entirety.

TECHNICAL FIELD

The present disclosure generally relates to the field of electronic device interaction and, more particularly, to an information processing method based on electronic device interaction and a first electronic device.

BACKGROUND

Electronic pens include active pens and passive pens. An electronic pen can communicate with an electronic device such as a tablet computer, and can be used as input device to perform input operations on the electronic device. However, because there are a large number of manufacturers producing electronic pens and electronic devices, compatibility problems are likely to occur between an electronic pen and an electronic device. For example, active pens produced by different manufacturers have different communication protocols, such that the active pens cannot be compatible with various tablet computers. Using an active pen, the user can only interact with a single tablet computer (such as a tablet computer produced by the same manufacturer), and cannot use it on other tablet computers, which undoubtedly causes a waste of resources for the user.

SUMMARY

In accordance with the disclosure, there is provided an information processing method including, in a situation that a connection between a first electronic device and a second electronic device is established for first time, obtaining identity information of the second electronic device; obtaining a communication protocol corresponding to the identity information; and based on a data path formed after the first electronic device is connected to the second electronic device, sending the communication protocol to the second electronic device, to enable the second electronic device to communicate with the first electronic device based on the communication protocol.

Also in accordance with the disclosure, there is provided a first electronic device including a processor and a memory storing a computer program that, when executed by the processor, cause the processor to, in a situation that a connection between the first electronic device and a second electronic device is established for first time, obtain identity information of the second electronic device; obtain a communication protocol corresponding to the identity information; and based on a data path formed after the first electronic device is connected to the second electronic device, send the communication protocol to the second electronic device, to enable the second electronic device to communicate with the first electronic device based on the communication protocol.

BRIEF DESCRIPTION OF THE DRAWINGS

The following drawings are merely examples for illustrative purposes according to various disclosed embodiments and are not intended to limit the scope of the present disclosure. In the drawings, same or similar reference numerals/characters refer to the same or corresponding parts.

The flowcharts shown in the drawings are only examples for illustrative purposes, and do not necessarily include all contents and operations/processes, nor do they have to be performed in the order described. For example, some operations/processes can be further divided, some operations/processes can be combined or partially combined, and the actual execution order may be changed according to the actual situation.

DETAILED DESCRIPTION

Hereinafter, embodiments and features consistent with the disclosure will be described with reference to drawings.

Various modifications may be made to the embodiments of the present disclosure. Thus, the described embodiments should not be regarded as limiting, but are merely examples. Those skilled in the art will envision other modifications within the scope and spirit of the present disclosure.

The accompanying drawings, which are incorporated in and constitute a part of this specification, illustrate embodiments of the present disclosure and, together with the general description of the disclosure above and the detailed description of the embodiments below, serve to explain the principle of the present disclosure.

These and other features of the present disclosure will become apparent from the following description of non-limiting embodiments with reference to the accompanying drawings.

Although the present disclosure is described with reference to some specific examples, those skilled in the art will be able to realize many other equivalents of the present disclosure.

The above and other aspects, features, and advantages of the present disclosure will become more apparent in view of the following detailed description when taken in conjunction with the accompanying drawings.

Specific embodiments of the present disclosure are hereinafter described with reference to the accompanying drawings. The described embodiments are merely examples of the present disclosure, which may be implemented in various ways. Specific structural and functional details described herein are not intended to be limiting, but merely serve as a basis for the claims and a representative basis for teaching one skilled in the art to variously employ the present disclosure in substantially any suitable detailed structure.

Phrases such as "one embodiment," "another embodiment," "some embodiments," or "some other embodiments" used in the present disclosure may refer to one or more of same or different embodiments consistent with the present disclosure.

The present disclosure provides an information processing method based on electronic device interaction. The method may be applied to a first electronic device. The first electronic device may be a tablet computer, a personal computer, or another device. The first electronic device may be connected to a second electronic device such as an electronic pen, such that the first electronic device and the second electronic device work together. The method may include: in a situation that a connection of first time with the second electronic device is established, obtaining identity information of the second electronic device. The first electronic device may obtain various situations related to the second electronic device from the identity information, including a first communication protocol used by the second electronic device to communicate with the first electronic device and other device (for example, a near-field wireless communication protocol, a base station communication protocol, or a wired communication protocol). In some situations, the second electronic device may not have the first communication protocol temporarily, and the first electronic device may send the first communication protocol to the second electronic device after obtaining the first communication protocol, such that the second electronic device is able to perform data interaction with the first electronic device based on the first communication protocol.

The first electronic device may be faced with a plurality of second electronic device of different models or types. When obtaining the corresponding first communication protocol based on the identity information, in one embodiment, a corresponding acquisition method based on the model information and/or type information of the second electronic device may be used to obtain the first communication protocol quickly and conveniently. In another embodiment, the identity information of all models and types of the second electronic device may be stored in a unified manner, and subsequently may be directly obtained from the memory when being called, thereby realizing unified management and unified calling. Further, it may be realized that even when facing different second electronic device, the first electronic device is able to normally use the second electronic device, such as normally using various types of electronic pens for input operation, thereby avoiding waste of resources.

Figure 1:
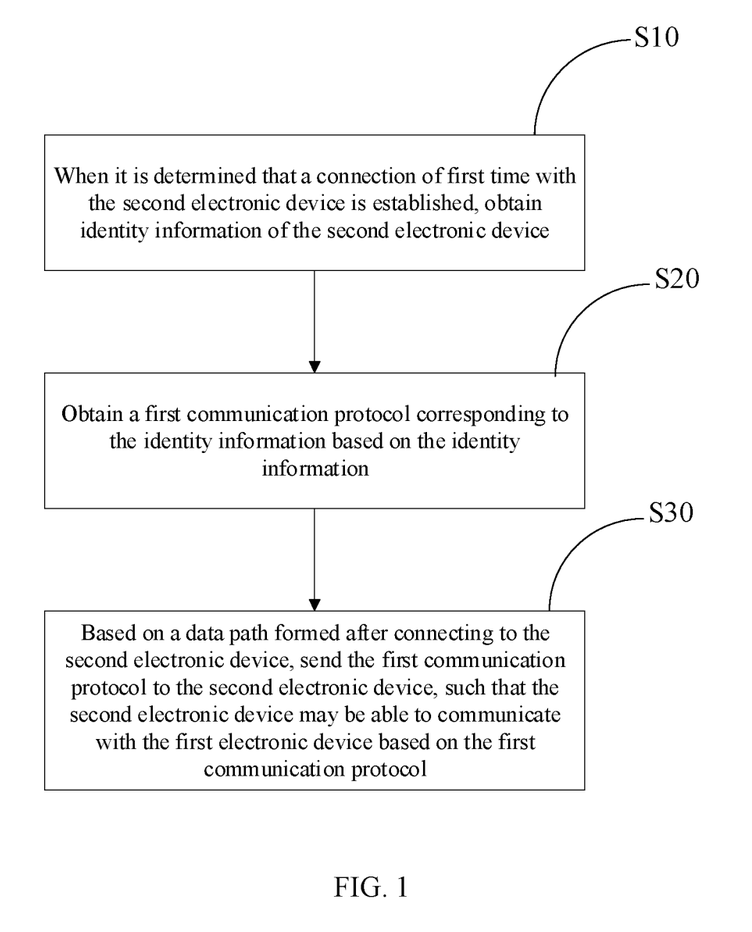
FIG. 1 is a flow chart of an example information processing method based on electronic device interaction consistent with the present disclosure.

FIG. 1 is a flow chart of an information processing method based on electronic device interaction. As shown in FIG. 1, the method includes S10 to S30.

At S10, in a situation that a connection of first time with the second electronic device is established, the identity information of the second electronic device is obtained.

The second electronic device may not be compatible with the first electronic device when it leaves the factory, and the first electronic device may not be able to perform data interaction with the second electronic device. For example, the second electronic device may be an electronic pen (such as an active pen) capable of performing input operations on the first electronic device such as a tablet computer. The electronic pen may be not matched with the tablet computer when it leaves the factory, and the electronic pen may not be able to perform input operations on the tablet computer based on the matched first communication protocol.

In this embodiment, the first electronic device may obtain the identity information of the second electronic device when it is determined that the connection of first time is established with the second electronic device (i.e., when it is determined that the connection with the second electronic device is established for the first time). The identity information may be expressed in various forms, such as character strings, ID numbers, information in an agreed form, and so on. The identity information may be obtained in various manners. In one embodiment, the first electronic device may send request information for requesting identity information to the second electronic device, and the second electronic device may respond and send its identity information to the first electronic device. In another embodiment, the second electronic device may actively report its own identity information after being connected to the first electronic device. In another embodiment, the first electronic device itself may store the identity information of a plurality of second electronic device in advance.

In addition, on the one hand, when the first electronic device establishes the connection of first time with the second electronic device, the first electronic device may obtain the identity information of the second electronic device for subsequent operations, to establish contact with the second electronic device and perform effective data communication every time (including the usage scenario of the connection of first time).

On the other hand, when the second electronic device and the first electronic device are not connected for the first time, the first electronic device and the second electronic device may have established an effective data path in the history, and the first electronic device may also obtain the identity information of the second electronic device, to determine the related information of the second electronic device currently connected to it.

At S20, a first communication protocol corresponding to the identity information is obtained based on the identity information.

The first communication protocol may be a communication protocol used when the first electronic device and the second electronic device perform data communication. Before performing data interaction with the first electronic device, the second electronic device may not have the first communication protocol, and thus is not able to communicate with the first electronic device immediately.

The first electronic device may need to obtain the first communication protocol corresponding to the identity information according to the identity information of the second electronic device, such that both the first electronic device and the second electronic device realize mutual data communication based on the first communication protocol.

The first electronic device may face a plurality of second electronic device of different models and different types. When obtaining the corresponding first communication protocol based on the identity information, a suitable acquisition method may be adopted according to the actual application scenario. In one embodiment, the identity information may include model information and/or type information of the second electronic device, and the first electronic device may obtain the model information and/or type information of the second electronic device by calling on the server, such that the first communication protocol may be obtained quickly and conveniently. In another embodiment, in response to a limited number of types of second electronic device, multiple first communication protocols with a small amount of data may be stored in the first electronic device, such that the first communication protocols may be directly called when in use. Correspondingly, the first communication protocol may be obtained simply and conveniently. In another embodiment, the first communication protocol may also be uniformly stored and managed in advance according to other practical application scenarios, and the operation of obtaining the first communication protocol may be performed based on the current application scenario during use.

At S30, based on the data path formed after being connected to the second electronic device, the first communication protocol is sent to the second electronic device, such that the second electronic device may be able to communicate with the first electronic device based on the first communication protocol.

Specifically, when the first electronic device is connected to the second electronic device, if the second electronic device does not have the first communication protocol, data interaction cannot be performed with the first electronic device. Correspondingly, after the first electronic device and the second electronic device are connected, the data path between them may be formed. On the one hand, the first electronic device may be connected with the second electronic device in the wire through a physical interface, and the data path may be formed through the wired line. On the other hand, when the second electronic device is within the wireless broadcast range of the first electronic device, the first electronic device may send a broadcast signal to the second electronic device by actively broadcasting to make the second electronic device respond. Therefore, the data path may be established.

After the data path is formed, the first electronic device may send the obtained first communication protocol to the second electronic device through the data path. The second electronic device may communicate with the first electronic device using the first communication protocol.

Figure 6:
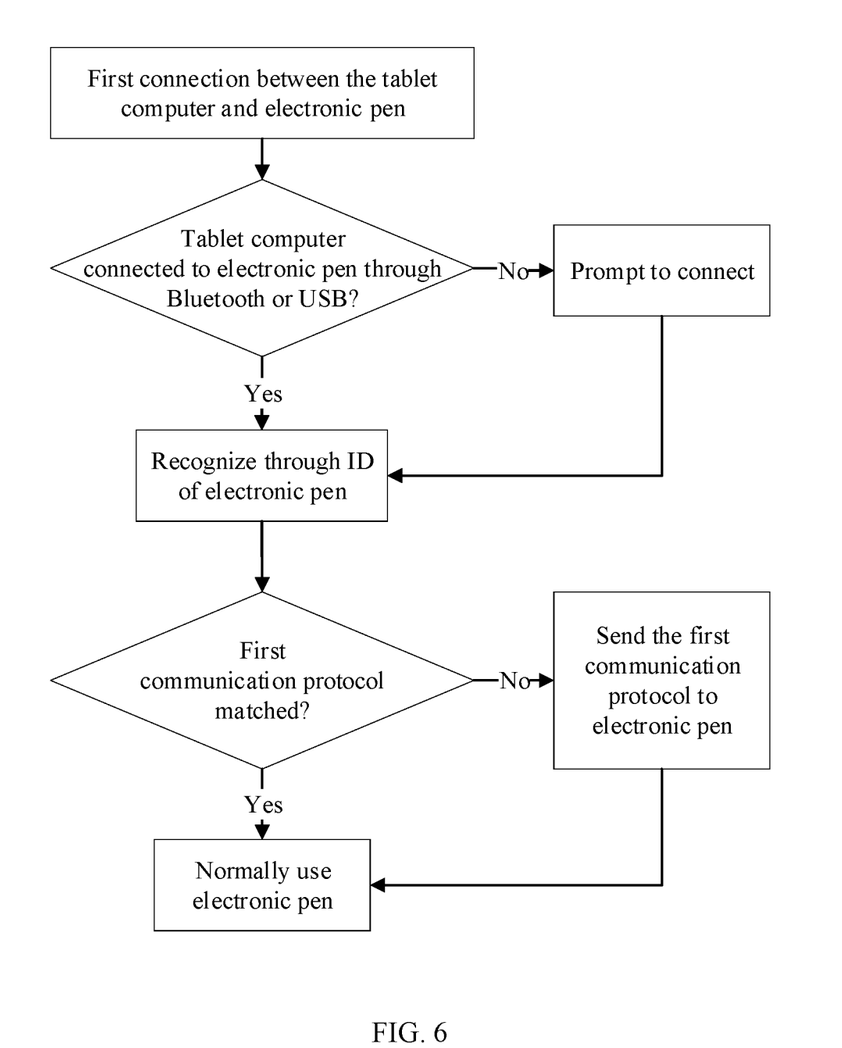
FIG. 6 is a flow chart of interaction between a tablet computer and an electronic pen consistent with the present disclosure.
Figure 7:
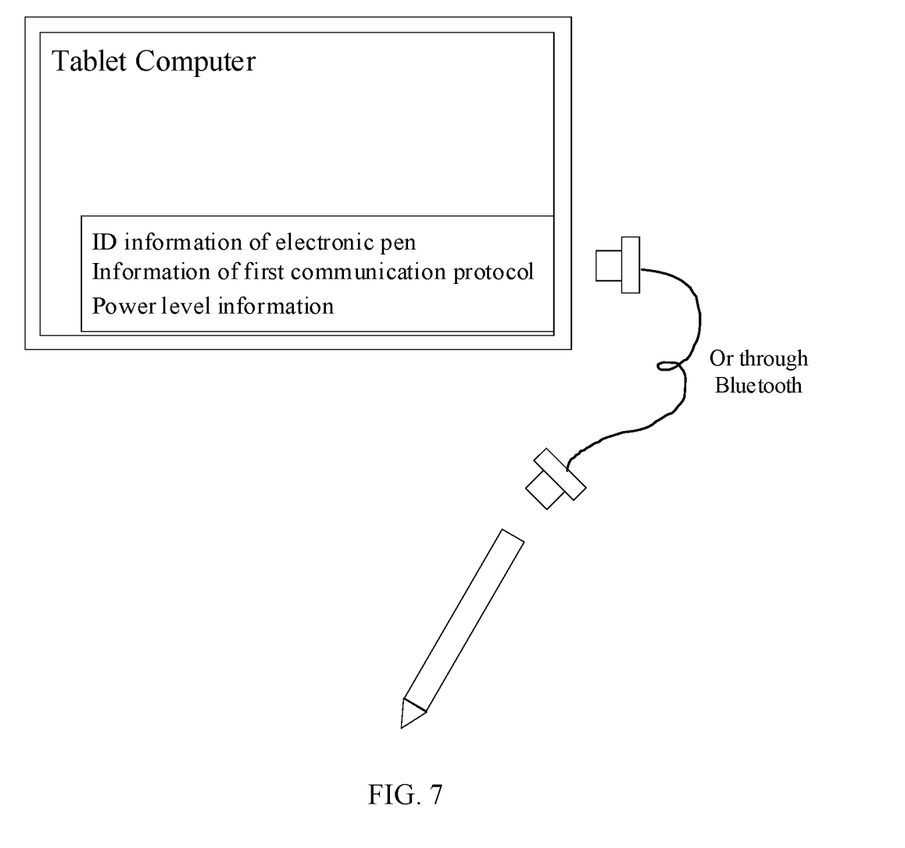
FIG. 7 is a schematic diagram showing connection of a tablet computer and an electronic pen consistent with the present disclosure.

In one embodiment shown in FIG. 6 and FIG. 7, the first electronic device is a tablet computer, and the second electronic device is an active pen (an electronic pen). The second electronic device may communicate with the first electronic device using Bluetooth or USB protocol, to input information to the first electronic device.

The information processing method provided by the present disclosure may enable the first electronic device to establish the data path with the second electronic device of any type and model, to use the second electronic device. Therefore, the first electronic device may be prevented from not being able to use the second electronic device because of incompatibility. Waste of resources and trouble to users may be avoided.

Figure 2:
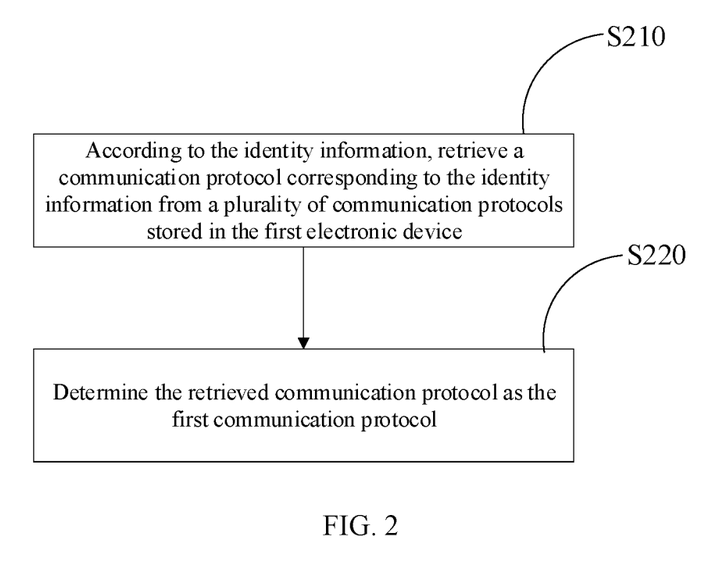
FIG. 2 is a flow chart of an example of S20 in FIG. 1 consistent with the present disclosure.

In one embodiment shown in FIG. 2, obtaining the first communication protocol corresponding to the identity information based on the identity information, includes S210 to S220.

At S210, according to the identity information, a communication protocol corresponding to the identity information is retrieved from a plurality of communication protocols stored in the first electronic device.

The first electronic device may store a plurality of communication protocols (also referred to as "candidate communication protocols" or "stored communication protocols") in its memory, and each communication protocol may correspond to a corresponding second electronic device, that is, each second electronic device may communicate with the first electronic device through a corresponding first communication protocol adapted to the second electronic device. The plurality of communication protocols stored in the first electronic device may include a near field wireless communication protocol, a base station communication protocol, or a wired communication protocol, or the like.

The first electronic device may call a communication protocol matching the second electronic device from the plurality of communication protocols stored in advance, according to the identity information of the second electronic device. In one embodiment, in response to the second electronic device itself corresponding to multiple types of communication protocols, one of the communication protocols may be selected according to a preset arrangement sequence. In another embodiment, in response to the second electronic device itself corresponding to multiple types of communication protocols, the communication protocol used in the previous communication may be selected to establish communication with the first electronic device.

At S220, the retrieved communication protocol is determined as the first communication protocol.

Specifically, any of the communication protocols may be determined as the first communication protocol. In this embodiment, the communication protocol called by the first electronic device may be determined as the first communication protocol.

For example, in the current usage scenario, the second electronic device itself may correspond to multiple types of communication protocols, and the first electronic device may determine one of the communication protocols as the first communication protocol according to historical data, and the first communication protocol may be sent to the second electronic device.

Figure 3:
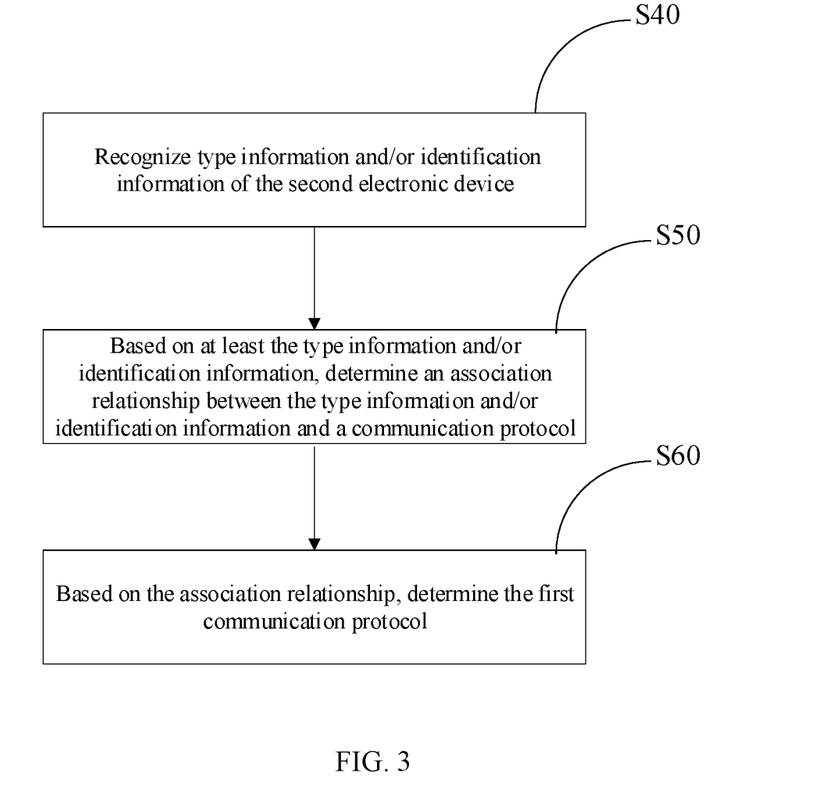
FIG. 3 is a flow chart of another example information processing method based on electronic device interaction consistent with the present disclosure.

In one embodiment, the identity information may include at least one of type information or identification information. Correspondingly, before obtaining the first communication protocol, as shown in FIG. 3, the method further includes S40 to S60.

At S40, the type information and/or identification information of the second electronic device are recognized.

The identity information of the second electronic device may include the type information or the identification information. The second electronic device may carry the type information and/or identification information. The first electronic device may perform recognition on the type information and/or identification information of the second electronic device, to determine the identity of the second electronic device.

At S50, based on at least the type information and/or identification information, an association relationship between the type information and/or identification information and a communication protocol is determined.

There may be an association relationship between the type information and/or the identification information and the communication protocol. The association relationship may be specifically constructed based on the communication protocol possessed by the second electronic device. The association relationship may be determined through the type information and/or the identification information during use. The determined association relationship may be stored in the first electronic device, or may be stored in the server.

For example, when the second electronic device is a Bluetooth device, a first association relationship with the Bluetooth protocol may be determined according to the identification information of the Bluetooth device.

At S60, based on the association relationship, the first communication protocol is determined.

The association relationship may be the relationship between the type information and/or the identification information and the communication protocol. Therefore, the first communication protocol may be determined based on the association relationship. For example, the first communication protocol may be determined to be the Bluetooth protocol based on the above-mentioned first association relationship.

Figure 4:
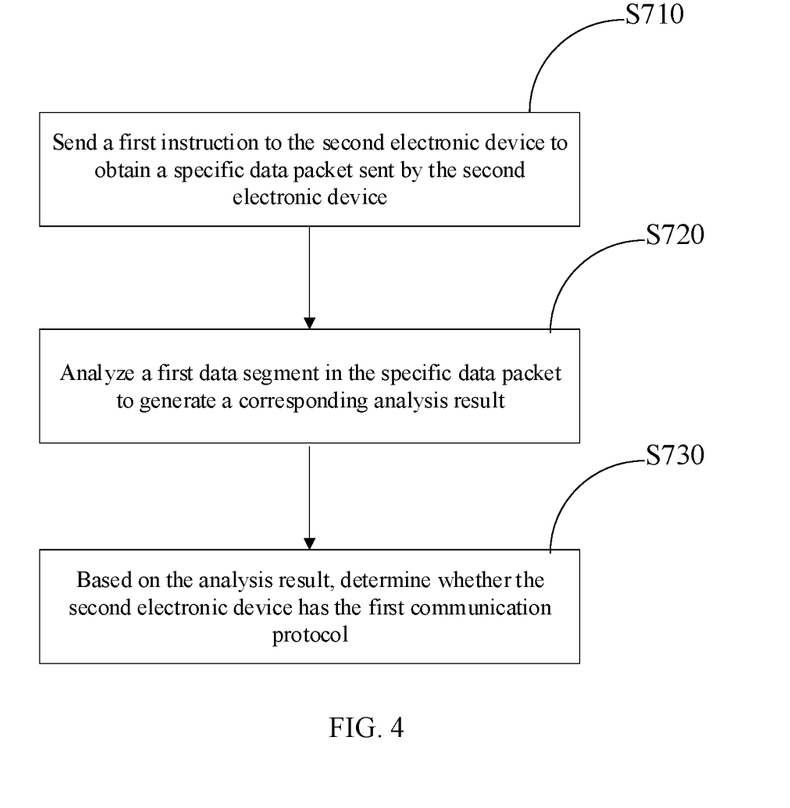
FIG. 4 is a flow chart of another example information processing method based on electronic device interaction consistent with the present disclosure.

In one embodiment, the method may further include determining whether the second electronic device has the first communication protocol. As shown in FIG. 4, the method specifically includes:

S710, sending a first instruction to the second electronic device to obtain a specific data packet sent by the second electronic device;

S720, analyzing a first data segment in the specific data packet to generate a corresponding analysis result; and S730, based on the analysis result, determining whether the second electronic device has the first communication protocol.

Specifically, the second electronic device may store the first communication protocol, or may not originally have the first communication protocol. The first electronic device may need to determine whether the second electronic device has the first communication protocol. Therefore, the communication with the second electronic device may be performed by adopting an operation mode adapted to the determination result.

The first electronic device may send the first instruction to the second electronic device through the data path, to request the second electronic device to send information that may be used to determine whether the second electronic device has the first communication protocol. The second electronic device may send the specific data packet to the first electronic device after receiving the first instruction. The specific data packet may include a plurality of data segments and the first data segment may represent whether the second electronic device has the first communication protocol. The first electronic device may determine whether the second electronic device has the first communication protocol by analyzing the first data segment.

In addition, the specific data packet may also include other data segments, including other information of the second electronic device. For example, when the identity information is not stored in the first electronic device (the identity information may also be originally stored on the first electronic device), the second electronic device may send its identity information to the first electronic device through other data segments. A second communication protocol possessed by the second electronic device at the same time may also be sent to the first electronic device. The first electronic device may determine the communication protocol simultaneously possessed by the second electronic device.

Figure 5:
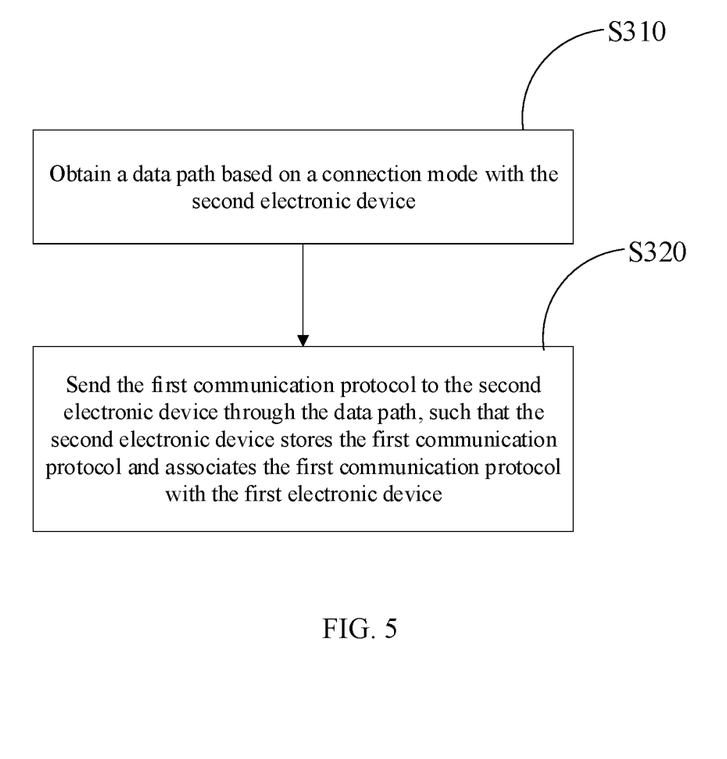
FIG. 5 is a flow chart of an example of S30 in FIG. 1 consistent with the present disclosure.

In one embodiment, sending the first communication protocol to the second electronic device based on the data path formed after being connected to the second electronic device, as shown in FIG. 5, includes S310 to S320.

At S310, the data path is obtained based on a connection mode with the second electronic device.

The first electronic device and the second electronic device may have different connection modes, such as wireless connection or wired connection, and different connection modes may correspond to different data paths. For example, the first electronic device and the second electronic device may be connected through a USB connection line, and the data path may be formed through the USB connection line correspondingly.

At S320, the first communication protocol is sent to the second electronic device through the data path, such that the second electronic device stores the first communication protocol and associates the first communication protocol with the first electronic device.

A variety of communication protocols may be stored in the first electronic device, including the first communication protocol. The first electronic device may send the first communication protocol to the second electronic device, and the second electronic device may store the first communication protocol in its memory, such that the first communication protocol is able to be used any time to communicate with the first electronic device.

However, the first electronic device may not use the first communication protocol in the current situation. After it is determined that communication with the second electronic device via the first communication protocol is needed, the first communication protocol may be associated with the first electronic device for subsequent use. Correspondingly, the first electronic device may not need to be associated with a large number of different types of communication protocols, and may be associated with a communication protocol only when it is used. System resources of the first electronic device may be saved, to avoid slowing down the operation efficiency of the first electronic device.

In one embodiment, the method may further include:

in a situation that the second electronic device is connected to the first electronic device again, driving the second electronic device to call the stored first communication protocol to communicate with the first electronic device.

Specifically, after the second electronic device communicates with the first electronic device for the first time, the second electronic device may receive the first communication protocol sent by the first electronic device. The second electronic device may store the first communication protocol in its own memory. After the second electronic device is reconnected to the first electronic device, the first electronic device may drive the second electronic device to call the stored first communication protocol to communicate with the first electronic device without the need to determine the communication protocol, thereby improving processing efficiency.

In one embodiment, the method may further include:

in a situation that the first communication protocol exists in the second electronic device, sending a second instruction to the second electronic device, such that the second electronic device uses the first communication protocol directly for communication with the first electronic device including receiving the input data sent by the second electronic device.

Specifically, when the second electronic device already has the first communication protocol when being connected to the first electronic device for the first time, the first electronic device may not need to send the first communication protocol to the second electronic device again. Instead, the second instruction may be sent to the second electronic device to inform the second electronic device that the first communication protocol is able to be used for communication directly. After the second electronic device receives the second instruction, the second electronic device may directly communicate with the first electronic device based on the first communication protocol.

In one embodiment, as shown in FIG. 7, the second electronic device is an input device of the first electronic device. For example, the first electronic device is a tablet computer and the second electronic device is an active pen (electronic pen). The second electronic device may perform data input operation on the first electronic device through the first communication protocol.

In one embodiment, the method may further include:
determining whether the second electronic device establishes a connection with the first electronic device; and
when the connection is not established, generating prompt information to instruct the second electronic device to perform a connection operation.

Specifically, when the second electronic device is connected to the first electronic device, a connection error may occur, such that no data path is established. The first electronic device may determine the connection status. When the connection between the electronic device is not established, the prompt information may be generated to prompt the user. In one embodiment, the prompt information may also be used to instruct the second electronic device to perform the connection operation. For example, the user may be informed in the form of pictures and texts, such that the user may reconnect the second electronic device to the first electronic device.

As shown in FIG. 7, in one embodiment, the first electronic device may also display relevant information of the second electronic device including, for example, information of the first communication protocol used by the second electronic device, ID information, power information, and the like, for the convenience of users.

In one embodiment, the first electronic device may store different first communication protocols corresponding to different second electronic devices, and the identity information of the different second electronic devices. The first communication protocols may be associated with the identity information.

Specifically, the first electronic device may store not only multiple first communication protocols, but also identity information of different second electronic device, and the first communication protocols may have an associated relationship with the identity information. Therefore, after determining the identity information of the second electronic device, the corresponding first communication protocol may be determined directly according to the association relationship. Of course, the first electronic device may not store the identity information, but obtain the identity information by requesting from the second electronic device or from other device such as the server.

Figure 8:
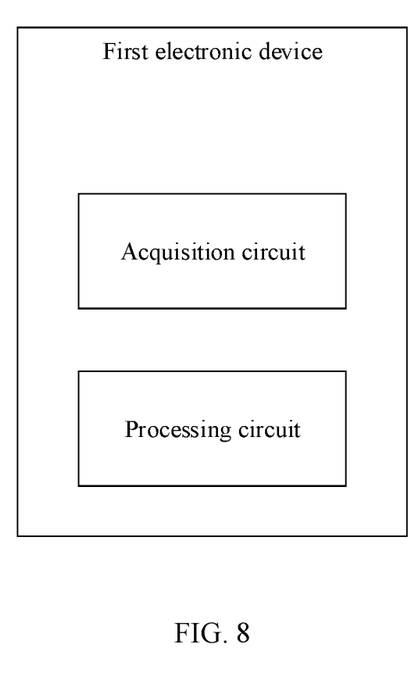
FIG. 8 is a structure diagram of a first electronic device consistent with the present disclosure.

The present disclosure also provides a first electronic device. As shown in FIG. 8, in one embodiment, the electronic device includes an acquisition circuit and a processing circuit.

The acquisition circuit may be configured to: in a situation that the connection of first time with the second electronic device is established, obtain the identity information of the second electronic device; and obtain the first communication protocol corresponding to the identity information based on the identity information.

The second electronic device may not be compatible with the first electronic device when it leaves the factory, so the first electronic device may not be able to perform data interaction with the second electronic device. For example, the second electronic device may be an electronic pen (such as an active pen) capable of performing input operations on the first electronic device such as a tablet computer. However, when the electronic pen is not matched with the tablet computer when it leaves the factory, the electronic pen may be not able to perform input operations on the tablet computer based on the matched first communication protocol.

In this embodiment, the first electronic device may obtain the identity information of the second electronic device when it is determined that the connection of first time is established with the second electronic device. The identity information may be expressed in various forms, such as character strings, ID numbers, information in an agreed form, and so on. The identity information may be obtained in various means. In one embodiment, the first electronic device may send request information for requesting identity information to the second electronic device, and the second electronic device may respond and send its own identity information to the first electronic device. In another embodiment, the second electronic device may actively report its own identity information after connecting to the first electronic device. In another embodiment, the first electronic device itself may store the identity information of a plurality of second electronic device in advance.

In addition, on the one hand, when the first electronic device establishes the connection of first time with the second electronic device, the first electronic device may obtain the identity information of the second electronic device for subsequent operations, to establish contact with the second electronic device and perform effective data communication every time (including the usage scenario of the connection of first time).

On the other hand, when the second electronic device and the first electronic device are not connected for the first time, the first electronic device and the second electronic device may have established an effective data path in the history, and the first electronic device may also obtain the identity information of the second electronic device, to determine the related information of the second electronic device currently connected to it.

The first communication protocol may be a communication protocol used when the first electronic device and the second electronic device perform data communication. Before performing data interaction with the first electronic device, the second electronic device may not have the first communication protocol, and thus is not able to communicate with the first electronic device immediately.

The first electronic device may need to obtain the first communication protocol corresponding to the identity information according to the identity information of the second electronic device, such that both the first electronic device and the second electronic device realize mutual data communication based on the first communication protocol.

The first electronic device may face a plurality of second electronic device of different models and different types. When obtaining the corresponding first communication protocol based on the identity information, a suitable acquisition method may be adopted according to the actual application scenario. In one embodiment, the identity information may include model information and/or type information of the second electronic device, and the first electronic device may obtain the model information and/or type information of the second electronic device by calling on the server, such that the first communication protocol may be obtained quickly and conveniently. In another embodiment, in response to a limited number of types of second electronic device, multiple first communication protocols with a small amount of data may be stored in the first electronic device, such that the first communication protocols may be directly called when in use. Correspondingly, the first communication protocol may be obtained simply and conveniently. In another embodiment, the first communication protocol may also be uniformly stored and managed in advance according to other practical application scenarios, and the operation of obtaining the first communication protocol may be performed based on the current application scenario during use.

The first communication protocol may be a communication protocol used when the first electronic device and the second electronic device perform data communication. Before performing data interaction with the first electronic device, the second electronic device may not have the first communication protocol, and thus is not able to communicate with the first electronic device immediately.

The acquisition circuit may need to obtain the first communication protocol corresponding to the identity information according to the identity information of the second electronic device, such that both the first electronic device and the second electronic device realize mutual data communication based on the first communication protocol.

The first electronic device may face a plurality of second electronic device of different models and different types. When obtaining the corresponding first communication protocol based on the identity information, a suitable acquisition method may be adopted according to the actual application scenario. In one embodiment, the identity information may include model information and/or type information of the second electronic device, and the first electronic device may obtain the model information and/or type information of the second electronic device by calling on the server, such that the first communication protocol may be obtained quickly and conveniently. In another embodiment, in response to a limited number of types of second electronic device, multiple first communication protocols with a small amount of data may be stored in the first electronic device, such that the first communication protocols may be directly called when in use. Correspondingly, the first communication protocol may be obtained simply and conveniently. In another embodiment, the first communication protocol may also be uniformly stored and managed in advance according to other practical application scenarios, and the operation of obtaining the first communication protocol may be performed based on the current application scenario during use.

The processing circuit may be configured to, based on the data path formed after being connected to the second electronic device, send the first communication protocol to the second electronic device, such that the second electronic device may be able to communicate with the first electronic device based on the first communication protocol.

Specifically, when the first electronic device is connected to the second electronic device, if the second electronic device does not have the first communication protocol, data interaction cannot be performed with the first electronic device. Correspondingly, after the first electronic device and the second electronic device are connected, the data path between them may be formed. On the one hand, the first electronic device may be connected with the second electronic device in wire through a physical interface, and the data path may be formed through the wired line. On the other hand, when the second electronic device is within the wireless broadcast range of the first electronic device, the first electronic device may send a broadcast signal to the second electronic device by actively broadcasting to make the second electronic device respond. Therefore, the data path may be established.

After the data path is formed, the first electronic device may send the obtained first communication protocol to the second electronic device through the data path. The second electronic device may communicate with the first electronic device using the first communication protocol.

For example, the first electronic device may be a tablet computer, and the second electronic device may be an active pen (an electronic pen). The second electronic device may communicate with the first electronic device using a Bluetooth or a USB protocol, to input information to the first electronic device.

In one embodiment, the acquisition circuit may be further configured to:
  according to the identity information, retrieve a communication protocol corresponding to the identity information from a plurality of communication protocols stored in the first electronic device; and
  determine the retrieved communication protocol as the first communication protocol.

In one embodiment, the identity information may include at least one of type information or identification information. Correspondingly, the electronic device may further include an identification circuit. The identification circuit may be configured to:
  before obtaining the first communication protocol, recognize the type information and/or identification information of the second electronic device;
  based on at least the type information and/or identification information, determine an association relationship between the type information and/or identification information and a communication protocol; and
  based on the association relationship, determine the first communication protocol.

In another embodiment, the electronic device may further include an identification circuit. The identification circuit may be configured to determine whether the second electronic device has the first communication protocol The identification circuit may be specifically configured to:
  send a first instruction to the second electronic device to obtain a specific data packet sent by the second electronic device;
  analyze a first data segment in the specific data packet, and generate a corresponding analysis result; and
  based on the analysis result, determine whether the second electronic device has the first communication protocol.

In one embodiment, the processing circuit may be further configured to:
  obtain the data path based on the connection mode with the second electronic device; and
  send the first communication protocol to the second electronic device through the data path, such that the second electronic device stores the first communication protocol and associates the first communication protocol with the first electronic device.

In one embodiment, the processing circuit may be further configured to:
  in a situation that the second electronic device is connected to the first electronic device again, drive the second electronic device to call the stored first communication protocol to communicate with the first electronic device.

In one embodiment, the processing circuit may be further configured to:
  in a situation that the first communication protocol exists in the second electronic device, send a second instruction to the second electronic device, such that the second electronic device uses the first communication protocol directly for communication with the first electronic device including receiving the input data sent by the second electronic device.

In one embodiment, the electronic device may further include a prompt circuit. The prompt circuit may be configured to:
- determine whether the second electronic device establishes a connection with the first electronic device; and
- when the connection is not established, generate prompt information to instruct the second electronic device to perform a connection operation.

In one embodiment, the first electronic device may store different first communication protocols corresponding to different second electronic device, and the identity information of the different second electronic device. The first communication protocols may be associated with the identity information.

The present disclosure further provides an electronic device (such as a first electronic device) including a memory and a processor. The memory can include, for example, a non-transitory computer-readable storage medium, such as a random-access memory, a read-only memory, etc. The memory stores a computer program that, when executed by the processor, causes the processor to perform a method consistent with the disclosure, such as one of the example methods described above.

Various embodiments have been described to illustrate the operation principles and exemplary implementations. It should be understood by those skilled in the art that the present disclosure is not limited to the specific embodiments described herein and that various other obvious changes, rearrangements, and substitutions will occur to those skilled in the art without departing from the scope of the disclosure. Thus, while the present disclosure has been described in detail with reference to the above described embodiments, the present disclosure is not limited to the above described embodiments, but may be embodied in other equivalent forms without departing from the scope of the present disclosure.

What is claimed is:

1. An information processing method comprising:
   - in a situation that a connection between a first electronic device and a second electronic device is established for first time, obtaining identity information of the second electronic device;
   - obtaining a communication protocol corresponding to the identity information, the communication protocol including at least one of a near-field wireless communication protocol, a base station communication protocol, or a wired communication protocol; and
   - based on a data path formed after the first electronic device is connected to the second electronic device, sending the communication protocol to the second electronic device, to enable the second electronic device to communicate with the first electronic device based on the communication protocol;
   - wherein before receiving the communication protocol from the first electronic device, the second electronic device does not have the communication protocol and is not able to communicate with the first electronic device.

2. The method according to claim 1, wherein obtaining the communication protocol includes:
   - according to the identity information, retrieving the communication protocol corresponding to the identity information from a plurality of candidate communication protocols stored in the first electronic device.

3. The method according to claim 2, wherein retrieving the communication protocol includes:
   - recognizing at least one of type information or identification information of the second electronic device as the identity information;
   - based at least on the at least one of the type information or the identification information, determining an association relationship between the at least one of the type information or the identification information and the plurality of candidate communication protocols; and
   - based on the association relationship, determining the communication protocol corresponding to the identity information.

4. The method according to claim 1, further comprising:
   - determining whether the second electronic device has the communication protocol, including:
     - sending an instruction to the second electronic device to obtain a specific data packet from the second electronic device;
     - analyzing a data segment in the specific data packet to generate an analysis result; and
     - based on the analysis result, determining whether the second electronic device has the communication protocol.

5. The method according to claim 1, wherein sending the communication protocol to the second electronic device includes:
   - obtaining the data path based on a connection mode between the first electronic device and the second electronic device; and
   - sending the communication protocol to the second electronic device through the data path, to enable the second electronic device to store the communication protocol and associate the communication protocol with the first electronic device.

6. The method according to claim 5, further comprising:
   - in a situation that the second electronic device is connected to the first electronic device again, driving the second electronic device to call the communication protocol to communicate with the first electronic device.

7. The method according to claim 1, further comprising:
   - in a situation that the communication protocol exists in the second electronic device, sending an instruction to the second electronic device, to cause the second electronic device to communicate with the first electronic device using the communication protocol, a communication between the first electronic device and the second electronic device including receiving input data sent by the second electronic device.

8. The method according to claim 1, further comprising:
   - determining whether the second electronic device has established a connection with the first electronic device; and
   - in response to determining that no connection has been established, generating prompt information to instruct the second electronic device to perform a connection operation.

9. The method according to claim 1, wherein:
   - the second electronic device is one of a plurality of different second electronic device;
   - the first electronic device stores different communication protocols corresponding to the different second electronic devices and identity information of the different second electronic devices; and
   - the communication protocols corresponding to the different second electronic devices are associated with the identity information of the different second electronic devices.

10. A first electronic device comprising:
a processor; and
a memory storing a computer program that, when executed by the processor, cause the processor to:
in a situation that a connection between the first electronic device and a second electronic device is established for first time, obtain identity information of the second electronic device;
obtain a communication protocol corresponding to the identity information, the communication protocol including at least one of a near-field wireless communication protocol, a base station communication protocol, or a wired communication protocol; and
based on a data path formed after the first electronic device is connected to the second electronic device, send the communication protocol to the second electronic device, to enable the second electronic device to communicate with the first electronic device based on the communication protocol;
wherein before receiving the communication protocol from the first electronic device, the second electronic device does not have the communication protocol and is not able to communicate with the first electronic device.

11. The first electronic device according to claim 10, wherein the computer program further causes the processor to:
according to the identity information, retrieve the communication protocol corresponding to the identity information from a plurality of candidate communication protocols stored in the first electronic device.

12. The first electronic device according to claim 11, wherein the computer program further causes the processor to:
recognize at least one of type information or identification information of the second electronic device as the identity information;
based at least on the at least one of the type information or the identification information, determine an association relationship between the at least one of the type information or the identification information and the plurality of candidate communication protocols; and
based on the association relationship, determine the communication protocol corresponding to the identity information.

13. The first electronic device according to claim 10, wherein the computer program further causes the processor to:
determine whether the second electronic device has the communication protocol, including:
sending an instruction to the second electronic device to obtain a specific data packet from the second electronic device;
analyzing a data segment in the specific data packet to generate an analysis result; and
based on the analysis result, determining whether the second electronic device has the communication protocol.

14. The first electronic device according to claim 10, wherein the computer program further causes the processor to:
obtain the data path based on a connection mode between the first electronic device and the second electronic device; and
send the communication protocol to the second electronic device through the data path, to enable the second electronic device to store the communication protocol and associate the communication protocol with the first electronic device.

15. The first electronic device according to claim 14, wherein the computer program further causes the processor to:
in a situation that the second electronic device is connected to the first electronic device again, drive the second electronic device to call the communication protocol to communicate with the first electronic device.

16. The first electronic device according to claim 10, wherein the computer program further causes the processor to:
in a situation that the communication protocol exists in the second electronic device, send an instruction to the second electronic device, to cause the second electronic device to communicate with the first electronic device using the communication protocol, a communication between the first electronic device and the second electronic device including receiving input data sent by the second electronic device.

17. The first electronic device according to claim 10, wherein the computer program further causes the processor to:
determine whether the second electronic device has established a connection with the first electronic device; and
in response to determining that no connection has been established, generate prompt information to instruct the second electronic device to perform a connection operation.

18. The first electronic device according to claim 10, wherein:
the second electronic device is one of a plurality of different second electronic device;
the first electronic device stores different communication protocols corresponding to the different second electronic devices and identity information of the different second electronic devices; and
the communication protocols corresponding to the different second electronic devices are associated with the identity information of the different second electronic devices.

19. The method according to claim 1, wherein the first electronic device includes a tablet computer, and the second electronic device includes an electronic pen.

* * * * *